(12) United States Patent
Jackson et al.

(10) Patent No.: US 7,844,420 B2
(45) Date of Patent: Nov. 30, 2010

(54) MANUFACTURING SYSTEM PERFORMANCE ANALYSIS TOOL SOFTWARE ARCHITECTURE

(75) Inventors: Craig A. Jackson, Sterling Heights, MI (US); Jonathan H. Owen, Beverly Hills, MI (US)

(73) Assignee: GM Global Technology Operations, Inc, Detroit, MI (US)

( * ) Notice: Subject to any disclaimer, the term of this patent is extended or adjusted under 35 U.S.C. 154(b) by 548 days.

(21) Appl. No.: 11/198,207

(22) Filed: Aug. 5, 2005

(65) Prior Publication Data

US 2006/0173568 A1  Aug. 3, 2006

Related U.S. Application Data

(60) Provisional application No. 60/649,154, filed on Feb. 2, 2005.

(51) Int. Cl.
G06F 17/10 (2006.01)
(52) U.S. Cl. ....................................................... 703/2
(58) Field of Classification Search ....................... 703/2
See application file for complete search history.

(56) References Cited

U.S. PATENT DOCUMENTS

| | | | | |
|---|---|---|---|---|
| 5,229,948 A | * | 7/1993 | Wei et al. | 700/99 |
| 5,987,426 A | * | 11/1999 | Goodwin, III | 705/21 |
| 6,405,366 B1 | | 6/2002 | Lorenz, Sr. et al. | 717/107 |
| 6,556,882 B1 | * | 4/2003 | Conboy et al. | 700/108 |
| 7,213,208 B2 | * | 5/2007 | Reichel et al. | 715/746 |
| 2002/0087741 A1 | * | 7/2002 | Ing et al. | 709/328 |
| 2004/0225952 A1 | * | 11/2004 | Brown et al. | 714/819 |
| 2006/0010452 A1 | * | 1/2006 | Sattler et al. | 719/313 |

OTHER PUBLICATIONS

MSC.Software Corporation, "MSC.NASTRAN 2001 Release Guide" 2001, MSC.Software Corporation.*
Armin Zimmerman et al., "TimeNET—An Integrated Modeling and Performance Evaluation Tool for Manufacturing Systems", 1998, 1998 IEEE International Conference on Systems, Man and Cybernetics, pp. 535-540.*
Jeffrey M. Alden et al., "General Motors Increases Its Production Throughput", Jan. 2006, Interfaces, vol. 36, No. 1, pp. 6-25.*
Michael C. Fu, "Optimization for Simulation: Theory vs. Practice", 2002, INFORMS Journal on Computing, vol. 14, No. 3.*
Charles McLean et al., "The IMS mission architecture for distributed manufacturing simulation", 2000, Proceedings of the 2000 Winter Simulation Conference, pp. 1539-1548.*
ILOG AMPL CPLEX System Version 9.0 User's Guide, Sep. 2003, ILOG S.A., pp. 1-92.*
AMPL (A Mathematical Programming Language) at the University of Michigan Documentation, version 2, Aug. 1995, pp. 1-16.*
Armin Pruessner et al. "GAMS: A High Performance Modeling System for Large-Scale Modeling Applications", Oct. 2004, INFORMS, pp. 1-44.*

(Continued)

*Primary Examiner*—Paul L Rodriguez
*Assistant Examiner*—Russ Guill

(57) ABSTRACT

A software tool for manufacturing system performance analysis includes modeling and analysis functions. A modeling isolation layer provides user access to the analysis capabilities through object-based model building and analysis invocations. Various model, performance and higher level analyses are performed through analysis modules kept separate from any end-user application programs by the modeling isolation layer.

12 Claims, 1 Drawing Sheet

OTHER PUBLICATIONS

Arne Stolbjerg Drud, "Replaceable Solvers in GAMS", ARKI Consulting & Development, Sep. 2003, Workshop on Optimization/Modeling/Applications—15 Years GAMS Development—60 Years Alex Meeraus; pp. 1-40.*

* cited by examiner

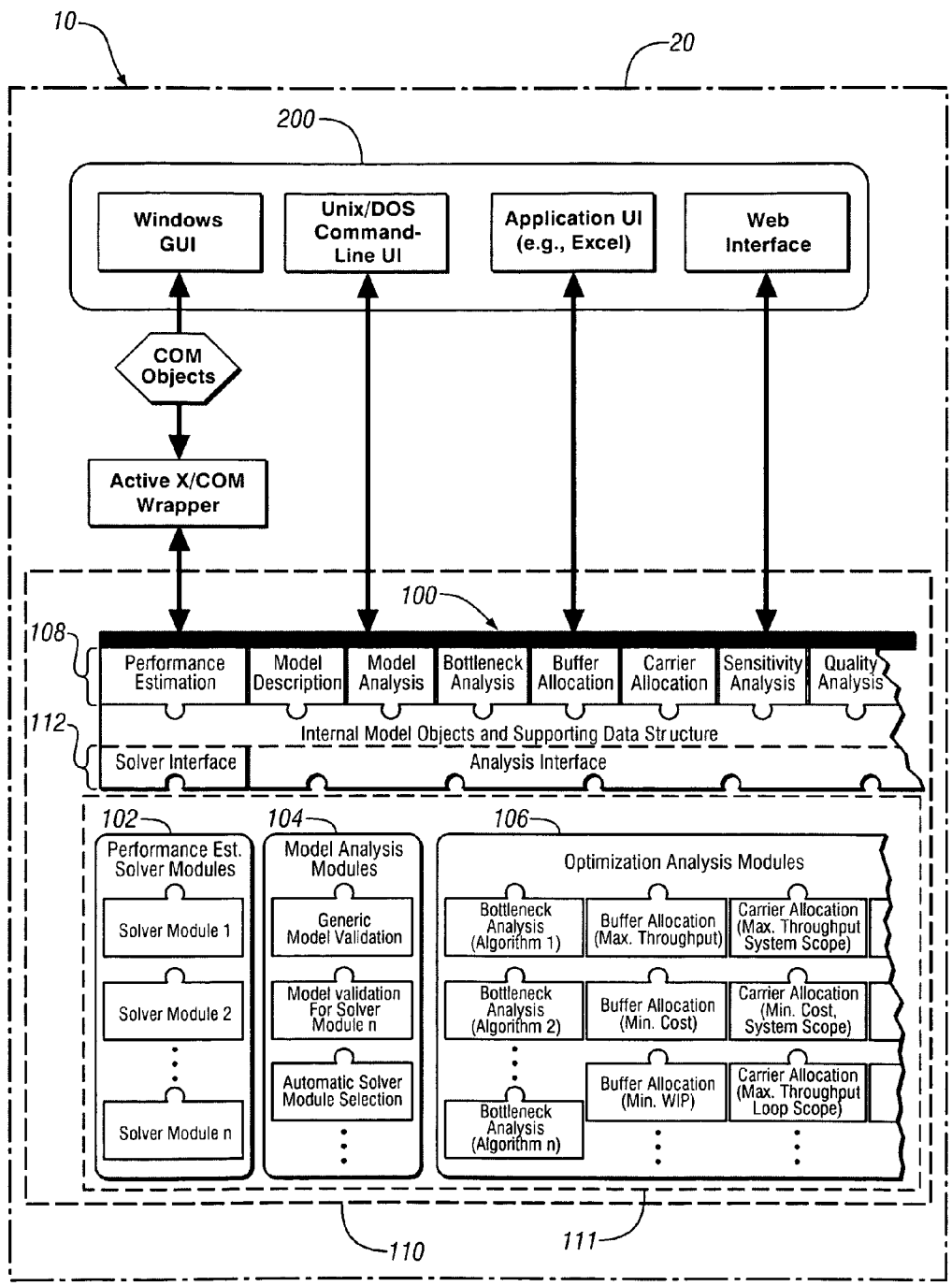

US 7,844,420 B2

MANUFACTURING SYSTEM PERFORMANCE ANALYSIS TOOL SOFTWARE ARCHITECTURE

CROSS REFERENCE TO RELATED APPLICATIONS

This application claims priority to U.S. provisional patent application Ser. No. 60/649,154 filed on Feb. 2, 2005, which is hereby incorporated herein by reference.

TECHNICAL FIELD

The present invention is related to manufacturing systems. More particularly, the invention is related to software-based manufacturing system performance analysis.

BACKGROUND OF THE INVENTION

Manufacturing systems comprise machines, transportation elements, computers, storage buffers, people and other resources that are used together for manufacturing. One characteristic of modern manufacturing systems is flexibility. Flexibility in manufacturing systems is necessary to meet, for example, variability in production volume and mix requirements and production changeovers as a result of new product introductions. With frequent new product introductions, product life cycles are shortened and so, too, are process lifetimes. This leads to frequent manufacturing system changes and the necessity for corresponding redesigning, rebuilding, retooling and reconfiguring of the manufacturing system transfer lines to accommodate such changes. Therefore, manufacturing enterprises are continually analyzing their manufacturing systems.

Manufacturing systems have progressed to a point where disciplined design and management tools are commonplace. Preferably, manufacturing systems are designed, configured and managed using tools that include input not only from product design engineering, but also of constraints and capabilities from diverse disciplines such as supply chain management, sales, marketing and forecasting, labor management, capital asset management and allocation, machine maintenance and manufacturing engineering, for example. All such disciplines can have pronounced effects upon the manufacturing system and are similarly significantly affected by the manufacturing system. All of these various disciplines benefit from manufacturing system analysis tools. However, the applications and uses tend to be specialized and diverse in accordance with the specific needs and requirements of the various interested disciplines. For example, a manufacturing engineer may require sophisticated "what-if" capabilities to design a new manufacturing system, while another user, responsible for day-to-day improvements of a particular transfer line operation, may need the ability to process performance data obtained through automatic data collection. Yet another user interested in enterprise-wide analysis may require web-based access to compare the performance of production lines at several different plants. Though the exemplary applications differ, the various disciplines may require common analysis capabilities.

Modern manufacturing system analysis tools manifest in the form of sophisticated computer-based modeling and analysis algorithms. The diverse application and use requirements from the various interested disciplines have influenced development and evolution of such tools into highly-integrated, end-user applications characterized by consolidated user interfaces and modeling and analysis capabilities. As such, these tools tend to be tied to specific computing platforms thus making widespread enterprise deployment both difficult and costly. Cross-application or inter-disciplinary utilization of modeling and analysis capabilities of such highly integrated tools is also inherently cumbersome, thus resulting in duplication of efforts and costs in the development of non-common tools and their underlying analysis capabilities.

SUMMARY OF THE INVENTION

A manufacturing system performance analysis tool software architecture includes a modeling isolation layer and a plurality of analysis modules. The isolation layer includes an application program interface, internal object constructor(s), and an analysis module interface. The application program interface enables application program interaction, such as from a variety of end-user application programs in constructing user objects. Internal objects corresponding to the user objects are generated by internal object constructors. The analysis module interface selectively binds the internal analysis objects to certain ones of the analysis modules. In accordance with one aspect of the invention, the user objects include a model class for providing the descriptive representation of a manufacturing system, and a solver class for use in conjunction with the model class in invoking solver-based analyses. Analysis modules may include: model analysis modules for providing, for example, model validations and solver selections; solver modules for providing, for example, various performance estimations such as throughput; and optimization analysis modules for providing, for example, such higher-level analyses of the manufacturing system as relates to reconfigurations and resource allocations to achieve predefined performance objectives.

A manufacturing system performance analysis tool software architecture includes an application program interface for providing user access to manufacturing system modeling and analysis functions. Modeling functions include user model object construction and system description utilizing a respective set of predefined user selectable methods. User model object construction implicitly invokes corresponding internal model object construction. Analysis functions include user solver object construction and system model analysis utilizing a respective set of predefined user selectable methods. User solver object construction implicitly invokes corresponding internal solver object construction. The manufacturing system performance analysis tool software architecture further includes an analysis module interface for selectively coupling each internal solver object to one of a plurality of discrete solver modules in accordance with the construction of the internal solver object. The analysis functions may further include user model analysis object construction and system model analysis utilizing a respective set of predefined user selectable methods. User model analysis object construction implicitly invokes corresponding internal model analysis object construction. The analysis module interface is further used for selectively coupling each internal model analysis object to one of a plurality of discrete model analysis modules in accordance with the construction of the internal model analysis object. The analysis functions may further include user optimization analysis object construction and system model analysis utilizing a respective set of predefined user selectable methods. User optimization analysis object construction implicitly invokes corresponding internal optimization analysis object construction. The analysis module interface is further used for selectively coupling each internal optimization analysis object to one of a plurality of discrete optimization analysis modules in accordance with the construction of the internal optimization analysis object. In this latter inclusion of user optimization analysis object construction, the analysis module interface is further used for iterative coupling ones of the plurality of discrete solver modules to the discrete optimization analysis modules in accordance with the constructions of the internal solver object and the internal optimization analysis object.

BRIEF DESCRIPTION OF THE DRAWINGS

The invention may take physical form in certain parts and arrangement of parts. For a more complete understanding of the present invention, and the advantages thereof, reference is now made to the following, descriptions taken in conjunction with the accompanying drawing, in which the FIGURE illustrates a preferred extensible, multi-layer software architecture for a manufacturing system performance tool in accordance with the present invention.

DESCRIPTION OF THE PREFERRED EMBODIMENT

The present invention includes an extensible, multi-layer software architecture for a manufacturing system performance analysis tool characterized by substantial decoupling of end-user applications and the underlying capabilities of the manufacturing system analysis tool. An isolation layer includes interfaces to user applications for accessing analysis capabilities and reporting analysis results. The isolation layer also includes interfaces to and between analytical modules of varying function, scope and abstraction to effect the analyses specified in accordance with the end-user applications.

The architecture provides a broadly adaptable interface to end-user applications via an application program interface (API) and isolation of the underlying analysis capabilities via object-based processes of the isolation layer managing messages, data and objects.

The application program interface (API) enables user construction of manufacturing system models, simulations and various analyses corresponding thereto. In the present exemplary embodiment, the underlying analysis capabilities include performance solver software modules for effecting a variety of solver algorithms and methods, model analysis software modules for validating the user defined manufacturing system models and assisted selection of the various solver modules, and manufacturing system optimization software modules for analysis of various manufacturing system model constructs through iterative processes utilizing the user defined manufacturing system models and the solver capabilities of the solver modules. Preferably, shared library structures are populated with the various analysis modules, object classes, corresponding methods and data structures.

Given this architecture wherein the underlying analysis capabilities are decoupled from the end-user applications, modular and library-based, the manufacturing system performance analysis tool is readily extensible. Analysis module changes, for example from underlying algorithm improvements, can be effected without affecting end-user applications, analysis module interfaces and, in most instances, without affecting the application program interfaces. Similarly, end-user application additions or changes, for example changes to the relational database used to store model data, can be readily effected without affecting the analysis capabilities of the analysis modules. This facilitates deployment and a high degree of availability of common analysis capabilities across a manufacturing enterprise without strictly defining or limiting the available end-user applications or the ability to port the analysis capabilities across a variety of computing platforms or problem domains. The architecture also enables distribution of the manufacturing system performance analysis tool across multiple computers using a network. For example, the isolation layer and analysis modules may reside on separate computers and utilize distributed grid computing and/or parallel processing.

Referring now to the FIGURE, there is shown a manufacturing system performance analysis tool according to the present invention, which is generally designated by the numeral 10. This manufacturing system performance tool 10 comprises a computing platform 20, which includes at least one user application program(s) 200 and manufacturing system performance analysis tool software architecture 110. As shown in the FIGURE, manufacturing system performance analysis tool software architecture 110 includes a modeling isolation layer 100, which provides a manufacturing system modeling language in the form of a functional application programming interface (API) 108. Architecture 110 also includes analysis modules 111 preferably comprising solver analysis modules 102, model analysis modules 104, and optimization analysis modules 106.

The application programming interface (API) 108 provides access to object-based libraries that can be called directly by any of a variety of application programs 200, examples of which are separately labeled in the FIGURE. Through the application program interface (API) 108, a user is able to construct different classes of user objects with available methods. Preferably, all of the class methods available are characterized by return types and parameter types that are restricted to certain standard data types (e.g. those provided by the ANSI C/C++ programming languages). This restriction enables widespread accessibility in that the data types available to most current applications and programming languages can be mapped directly into these standard data types.

At the most basic level of utility of the manufacturing system performance analysis tool, the user object construction includes abstract model class objects and abstract solver class objects. For each abstract class object, the modeling isolation layer 100 provides a corresponding internal object allocator, which generates internal objects which implement the abstract interface defined by the respective abstract user class. Model class user objects enable the descriptive representation of a manufacturing system (e.g. physical layout, workstation operating characteristics, and job flow behavior) including systems of widely varying degrees of complexity, specialty, detail and abstraction in accordance with the particular end-user application program 200 requirements, Solver class user objects are used in conjunction with the model class user objects in the invocation of solver-based analyses of the manufacturing system model. Each solver class user object utilizes an instance of an underlying solver module 102, which provides the actual solver analysis capabilities. The solver class user object is not itself directly bound to any solver module 102. Instead, the corresponding internal solver object allocated within the modeling isolation layer transforms and marshalls data between the user application(s) 200 and the underlying solver module. As such, the resultant solver class internal object is bound to an appropriate solver module 102 for effecting the desired performance estimation and data transfers across the solver interface.

Solver analysis modules 102 are also known as solvers and provide, for example, various performance estimation functions and capabilities such as production throughput estimations in accordance with the manufacturing system model definition. An exemplary solver might be able to examine a manufacturing system model and make a static assessment of the model's expected throughput capabilities using data contained within the model. Certain solvers may provide relatively quick results with relatively wide confidence factors whereas other solvers may provide results with tight confidence factors at the expense of relatively long run times. Certain solvers may be preferred or required for particular manufacturing system models whereas other solvers may be more generally applicable to any variety of manufacturing system model constructed in accordance with the available modeling capabilities provided through the application program interface (API). As a specific example of the analysis module interfaces 112 within modeling isolation layer 100, a solver interface defines the protocols by which the solvers 102 interact with the modeling isolation layer 100. The modeling isolation layer 100 includes a solver base class from which all solvers 102 are derived. New solvers which implement the existing solver interface can be developed and readily integrated within a library structure. Each solver may be implemented, for example, in shared link libraries (e.g. DLL file in a Microsoft Windows® platform, SO file in a UNIX® platform, etc.) or as a network-enabled service in a distributed environment.

Analogous to the model class and solver class user object construction described herein above, a user—through the application program interface (API) 108—is able to construct model analysis user objects with available methods. Again, it is preferred that all of the class methods available are characterized by return types and parameter types that are restricted to certain standard data types as set forth herein above. These model analysis class user objects are used in the invocation of model analyses of the manufacturing system model. Each model analysis user object utilizes an underlying model analysis module 104. However, as described for solver class objects herein above, the model analysis class user object is not itself directly bound to any model analysis module 104. Instead, an internal object allocator within the modeling isolation layer provides model analysis internal objects corresponding to the model analysis user objects. Each internal model analysis object provides an implementation of the interface defined by the respective abstract user class, transforming and marshalling data between the user application(s) 200 and the underlying model analysis module(s) 104. The resultant model analysis class internal object is then bound to an appropriate model analysis module 104 for effecting the desired model analysis and data transfers across the analysis interface.

Model analysis modules 104 provide, for example, model validation and solver selection functions and capabilities. Similar to the solver interface, the analysis interface defines the protocols by which the model analysis modules 104 interact with the isolation layer 100. The isolation layer 100 includes a model analysis base class from which all model analysis modules 104 are derived. New model analysis modules which implement the existing model analysis interface can be developed and readily integrated within a library architecture or network-enabled service as described herein above with respect to the solver module implementation.

In similar fashion to the prior descriptions of user and internal object constructions in model, solver and model analysis classes, the user is able to construct optimization analysis user objects with available methods accessible through the application program interface (API) 108. Again, it is preferred that all of the class methods available are characterized by return types and parameter types that are restricted to certain standard data types. These optimization analysis class user objects are used in the invocation of optimization analyses of the manufacturing system model. Each optimization analysis class user object utilizes an underlying optimization analysis module 106. However, the optimization analysis class user object is not itself directly bound to any optimization analysis module 106. Instead, an internal object allocator within the modeling isolation layer provides optimization analysis internal objects corresponding to the optimization analysis user objects. Each internal optimization analysis object provides an implementation of the interface defined by the respective abstract user class, transforming and marshalling data between the user application(s) 200 and the underlying optimization analysis module(s) 106. The resultant optimization analysis class internal object is then bound to an appropriate optimization analysis module 106 for effecting the desired optimization analysis and data transfers across the analysis interface.

Optimization modules 106 provide, for example, higher-level analysis capabilities such as various optimizations in manufacturing system design, asset and resource allocations, etc. Optimization modules 106 are generally characterized by reliance on, and interaction with, solvers 102 for performance estimation. A generic example of an optimization module is one which examines a manufacturing system model and searches for a feasible reconfiguration of the manufacturing system model that will achieve some predefined performance objective (e.g. a target throughput, scrap rate, defect rate, asset utilization, etc.). In the process, optimization modules 106 may iteratively interact with solvers 102 to determine performance estimates of the reconfigured manufacturing system model. Such interaction is achieved internal to the isolation layer via internal objects. Multiple optimization modules may be implemented, which solve the same optimization analysis using disparate algorithms. The modeling isolation layer 100 defines the protocols by which the optimization modules 106 interact with the isolation layer 100. The isolation layer 100 includes an optimization analysis base class from which all optimization analysis modules of a particular type 106 are derived. New optimization analysis modules which implement the existing optimization analysis interface can be developed and readily integrated within a library architecture or network-enabled service as described herein above with respect to the other analysis module implementations. In general, new optimization analysis modules may be added to the library architecture by adding a new application program interface (API) component to define the end-user interface to the new optimization module, and a new optimization analysis interface to define how the new optimization module will interact with the isolation layer 100.

As described, the modeling isolation layer 100, solvers 102, model analysis modules 104 and optimization analysis modules 106 may share data with each other. The data passed between these various elements may include system models and other objects. The isolation layer 100 defines a common set of data structures and protocols used to pass this data between these elements.

The invention has been described with reference to specific embodiments. The descriptions herein are not meant to be construed in a limiting sense. Rather, various modifications of the disclosed embodiments, as well as alternative embodiments of the invention will become apparent to persons skilled in the art upon reference to the description of the invention. It should be appreciated by those skilled in the art that the specific embodiments and implementations disclosed herein may be readily utilized as a basis for modifying or designing other structures for carrying out the same purposes of the present invention. It should also be realized by those skilled in the art that such equivalent constructions do not depart from the spirit and scope of the invention as set forth in the appended claims. It is therefore, contemplated that the claims will cover any such modifications or embodiments that fall within the true scope of the invention.

The invention claimed is:

1. A manufacturing system performance analysis tool comprising:
   a computing platform including at least one user application program and a manufacturing system performance analysis tool software architecture;
   said manufacturing system performance analysis tool software architecture further comprising:
   a modeling isolation layer including an application program interface, internal object constructors, and an analysis module interface,
   said application program interface providing user access to manufacturing system modeling and analysis functions that respectively provide for modeling and analysis of the performance of a manufacturing system, and enabling user application program interaction in constructing user objects, said internal object constructors effective to generate internal objects corresponding to said user objects;
   a plurality of analysis modules for providing manufacturing system analyses, said analysis module interface effective to selectively bind internal objects to ones of said plurality of manufacturing system analysis modules;
   wherein said modeling isolation layer decouples said analysis modules from said at least one user application program; and
   whereby said manufacturing system performance analysis tool is made modular, library-based, and readily extensible.

2. The manufacturing system performance analysis tool as claimed in claim 1 wherein said user objects comprise a model class and a solver class.

3. The manufacturing system performance analysis tool as claimed in claim 2 wherein said analysis modules comprise solver modules and said analysis module interface is effective to selectively bind internal objects corresponding to solver class user objects to solver modules.

4. The manufacturing system performance analysis tool as claimed in claim 2 wherein said user objects comprise an optimization analysis class, and wherein said analysis modules comprise optimization analysis modules and said analysis module interface is effective to selectively bind internal objects corresponding to optimization analysis class user objects to optimization analysis modules.

5. The manufacturing system performance analysis tool as claimed in claim 2 wherein said user objects comprise a model analysis class, and wherein said analysis modules comprise model analysis modules and said analysis module interface is effective to selectively bind internal objects corresponding to model analysis class user objects to model analysis modules.

6. The manufacturing system performance analysis tool as claimed in claim 1 wherein said analysis modules comprise model analysis modules.

7. The manufacturing system performance analysis tool as claimed in claim 1 wherein said analysis modules comprise solver modules.

8. The manufacturing system performance analysis tool as claimed in claim 1 wherein said analysis modules comprise optimization analysis modules.

9. A manufacturing system performance analysis tool comprising:
   a computing platform including at least one user application program and a manufacturing system performance analysis tool software architecture;
   said manufacturing system performance analysis tool software architecture further comprising:
   a modeling isolation layer further including an application program interface and an analysis module interface;
   said application program interface providing user access to manufacturing system modeling and analysis functions that respectively provide for modeling and analysis of the performance of a manufacturing system;
   said modeling functions including a) user model object construction invoking implicit internal model object construction and b) manufacturing system description utilizing a respective set of predefined user selectable methods;
   said analysis functions including a) user solver object construction invoking implicit internal solver object construction and b) manufacturing system model analysis utilizing a respective set of predefined user selectable methods;
   said analysis module interface effective to selectively couple said internal solver object to ones of a plurality of discrete solver modules in accordance with the construction of said internal solver object;
   wherein said modeling isolation layer decouples said manufacturing system analysis functions from said at least one user application program; and
   whereby said manufacturing system performance analysis tool is made modular, library-based, and readily extensible.

10. The manufacturing system performance analysis tool as claimed in claim 9 further comprising:
    said analysis functions including a) user model analysis object construction invoking implicit internal model analysis object construction and b) manufacturing system model analysis utilizing a respective set of predefined user selectable methods; and,
    said analysis module interface effective to selectively couple said internal model analysis object to ones of a plurality of discrete model analysis modules in accordance with the construction of said internal model analysis object.

11. The manufacturing system performance analysis tool as claimed in claim 9 further comprising:
    said analysis functions including a) user optimization analysis object construction invoking implicit internal optimization analysis object construction and b) manufacturing system model analysis utilizing a respective set of predefined user selectable methods; and,
    said analysis module interface effective to selectively couple said internal optimization analysis object to ones of a plurality of discrete optimization analysis modules in accordance with the construction of said internal optimization analysis object.

12. The manufacturing system performance analysis tool as claimed in claim 11 further comprising:
    said analysis module interface effective to iteratively couple ones of said plurality of discrete solver modules to said discrete optimization analysis modules in accordance with the constructions of said internal solver object and said internal optimization analysis object.

* * * * *